Y. M. CRÉCHRIOU.
CAR FENDER.
APPLICATION FILED JULY 28, 1908.
929,397.
Patented July 27, 1909.
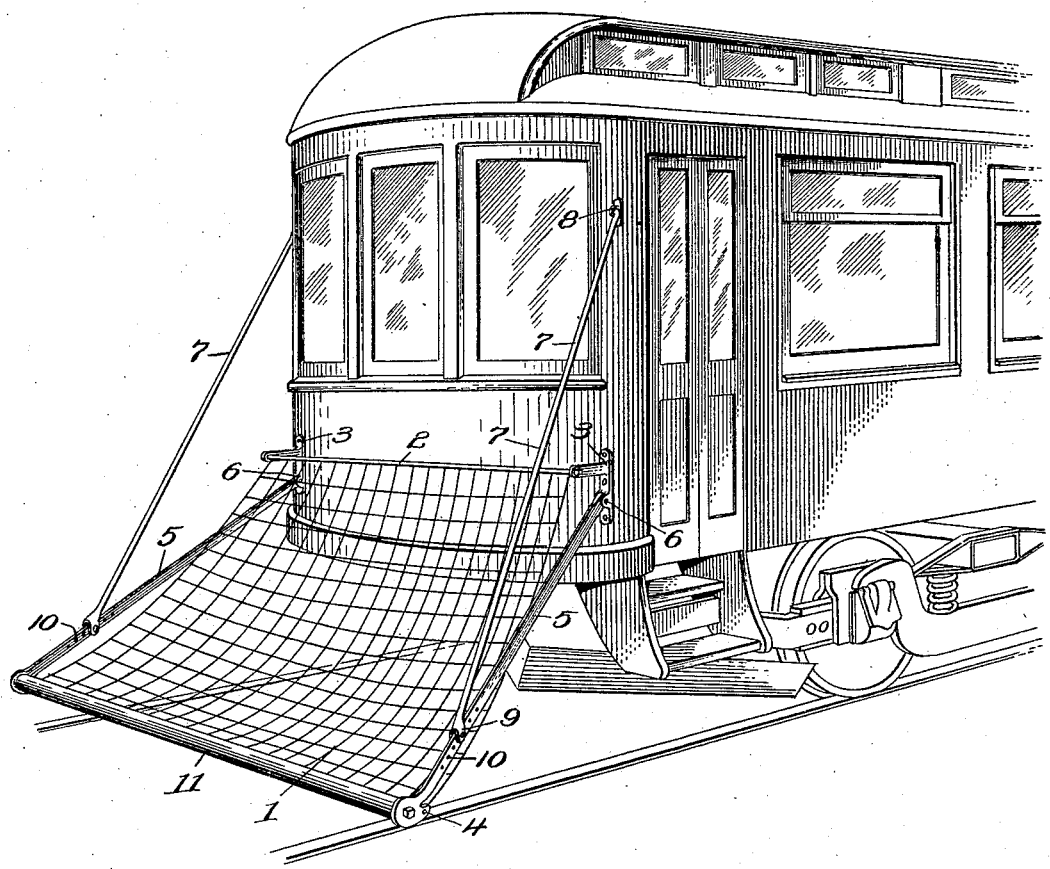
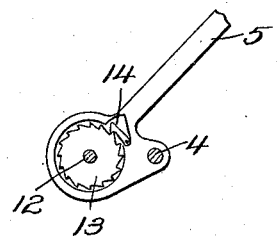
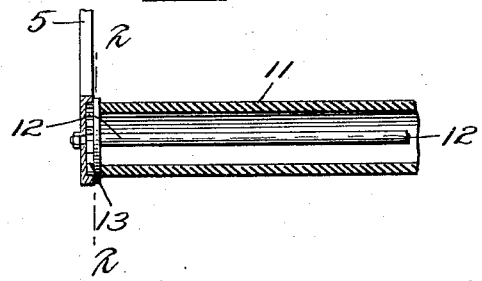
Inventor
Yves M. Créchriou.
Witnesses
F. C. Gibson.
C. Bradway.
By Victor J. Evans
Attorney

UNITED STATES PATENT OFFICE.

YVES MARIE CRÉCHRIOU, OF MONTEREY, CALIFORNIA.

CAR-FENDER.

No. 929,397.    Specification of Letters Patent.    Patented July 27, 1909.

Application filed July 28, 1908. Serial No. 445,821.

*To all whom it may concern:*

Be it known that I, YVES M. CRÉCHRIOU, a citizen of the United States, residing at Monterey, in the county of Monterey and State of California, have invented new and useful Improvements in Car-Fenders, of which the following is a specification.

This invention relates to fenders for street cars and it has for its object to provide a car fender of simple, durable and substantial construction, reliable and effective in use, and so designed as to prevent injury to persons struck or picked up thereby.

Another object of the invention is the provision of a pneumatic roller arranged at the striking part of the fender so as to form a cushion, the roller being adapted to rotate in such a direction as to exert a tendency to throw any objects into the net of the fender instead of passing under the latter and the car.

With these objects in view and others, as will appear as the description proceeds, the invention comprises the various novel features of construction and arrangement of parts which will be more fully described hereinafter and set forth with particularity in the claim appended hereto.

In the accompanying drawing, which illustrates one embodiment of the invention, Figure 1 is a perspective view of the front portion of a car with the improved fender applied thereto. Fig. 2 is a detail sectional view on line 2—2, Fig. 3. Fig. 3 is a detail sectional view taken longitudinally through one end of the roller.

Similar reference characters are employed to designate corresponding parts throughout the several views.

Referring to the drawing, 1 designates the net of the fender which is made of wire, rope or other suitable material and has its rear end connected with a cross bar 2 mounted on arms of the brackets 3 secured to the front dash of the car, while the front end of the net is secured to a second cross bar 4 carried on the outer ends of parallel links or arms 5 which are hingedly connected at 6 to the brackets 3 at a point below the arms thereof that support the rod 2. The said members 5 are suspended adjacent their outer ends by rods 7 that have their upper rear ends attached to the car at 8, the forward ends of the rods being adjustably connected with the side members 5 by pins 9 passing through any opening 10 in the side members and the openings in the rods themselves. By this means, the side members can be set at any desired angle to throw the front of the fender into proper relation with respect to the road-bed. Supported on the side members 5 at a point in front of the rod 4 is a hollow roller 11 of rubber or other suitable material which is closed and contains air so as to form a cushioning device for lessening the injury in case the fender strikes a person. Passing through the roller is a rod 12 that passes through the ends of the members 5 and secured to the end of the roller is a ratchet wheel 13, with which engages a pawl 14, the pawl and ratchet teeth being so arranged as to permit the roll to turn in a direction for leading objects that engage on the roll into the net and thus prevent them from passing under the net between the roll and the road-bed.

Having thus described the invention, what I claim is:—

A fender comprising brackets, a rod supported by the brackets, side members pivotally mounted on the brackets, a cross rod carried by the front ends of the members, a netting secured to the rods, rods attached to the car and adjustably connected with the members, a rotatable cushioning device extending across the front end of the net and supported on the side members, and a ratchet wheel and pawl device for controlling the rotation of the cushioning device.

In testimony whereof I affix my signature in presence of two witnesses.

YVES MARIE CRÉCHRIOU.

Witnesses:
STEPHEN LOVETT,
C. V. HOVE.